Patented Jan. 23, 1940

2,188,179

UNITED STATES PATENT OFFICE 2,188,179

METHOD FOR IMPROVING THE FLAVOR OF COFFEE

Gwynne Evans, St. Louis, Mo.

No Drawing. Application June 22, 1939, Serial No. 280,523

4 Claims. (Cl. 99—65)

This invention relates to the treatment of coffee and has for its primary object the provision of an improved method of preparing a batch of coffee berries to be subsequently roasted, ground, etc., so that the ultimate product will possess a substantially uniform flavor or taste throughout said batch, irrespective of the use of varieties of berries of substantially different quality initially admixed to constitute said batch.

Practical experience has demonstrated that the success of commercial enterprises devoted to the sale of coffees to the public depends essentially upon flavor or taste, and, it has been a common observation that where berries emanating from different sources and possessing their own differentiating characteristics are not subjected to like preparatory treatment, the desired uniformity of flavor or taste is not assuredly present through the various portions of the mixture or batch.

Many attempts have been made to insure such uniformity, but inherent uncertain factors have operated thereagainst. Customarily, the best practice has been to make careful selection of the berries obtained from various fields, countries, or sources, and mix these after the manner ascertained to be capable of resulting in the desired blend, roast the same to different degrees, and when the beverage has been prepared in the customary fashion, subject the latter to what is known as the "cup test" by abstracting and using the mixture from various portions of the batch and relying on the "tasters" to conclude whether the desired flavor or taste has been attained. If not, the mixture has, in instances, been subjected to a greater or less degree of roasting until approximately satisfactory results have been accomplished. However, when relying upon what was believed to be the adjusting or curing of the defects by varying the step of roasting, failure has frequently been met with because, while the "cup test" seemed to be satisfactory and, accordingly, a batch passed by inspection, other portions of the batch would be found by the ultimate user to be objectionable. This was because factors attending the growth of the various grades or kinds of coffee brought together in the mixture were ignored.

A good mixture which, under best conditions, would possess a satisfactory taste or flavor, may be illustrated as combining high grade of Bourbon Santos (Brazilian coffee), high altitude Medellin or Manizales (Colombian coffees), and high altitude Mexicans or Guatemalas or Kilimanjaros (an African coffee).

Owing to the superior conditions under which Brazilian coffee is grown, and where the same is subjected to substantial irradiation by the natural violet rays of the sun, that coffee will run well to standard and may be relied on quite fully at all times; and this is comparatively true of some of the other high altitude coffees where, because of such altitudes, that coffee also is subjected to the beneficial influence of irradiation by said violet rays of the sun. However, such precise or relatively perfect conditions lending themselves to mixtures of coffee with resultant definite control of taste, seldom prevail or persist. Adverse conditions continually arise, because some coffee in the blend has been affected by adverse crop conditions, too long exposure on docks, open warehouses or platforms, or because of having been transported from its source to the place of use in poor hulls (it being approximated that about sixty days is required for coffee to be carried from coffee sources to the United States under most favorable customary conditions). Humidity and other climatic conditions, exposure or lack of exposure of the coffee while awaiting shipment, storage, etc., also offer changing conditions affecting qualities in different lots of berries. All of these items, and others, constitute a hazard or risk, warning against simply mixing the berries from the various sources, with the expectation that all portions of a given batch will result in uniformity of taste characteristics.

The present invention embraces the taking of different coffees in the condition in which they are received and subjecting a mixture thereof to a like or equivalent processing, bringing them all up to a predetermined standard positively assuring a nicety of flavor and taste; also eliminating objectionable so-called green or grassy flavor so often encountered. The latter constitutes a serious detriment to the sale of any brand of coffee, even though the utmost care has been exercised in the blending thereof. As heretofore inferred, this green or grassy taste of some of the coffee of a blend inevitably escapes the tests of the "tasters," because, obviously, all coffee going to make up the mixture or batch cannot possibly be "cup-tested" or, in fact, tested in any other practical fashion.

With the foregoing understanding of conditions in mind, the preferred embodiment of my invention may be said to involve intimate mixing of the selected different coffee berries together and then subjecting the entire mixture or batch to a treatment of ultra-violet rays—for example, through the medium of lamps, obtainable in the market and capable of imparting ultra-violet rays—so that all of the berries of the mixture or batch, inclusive of those that have in their natural growth been subjected to the natural violet rays of the sun, will be subjected to the influence of the rays over and above all previously received, to greater or less extents, from the sun.

The invention embraces the idea of giving all of the berries, notwithstanding their different sources of origin, the same or equivalent treatment, so that a desired standard for the whole is attained.

It is estimated that ultra-violet rays are possibly as much as ten times as strong as the rays of the sun to which the berries in their normal growth are submitted; so that by subjecting all of the berries of the mixture or batch to the ultra-violet rays for a sufficient period of time, the berries of inferior quality are cured to a point beyond the cured state of the better-quality berries that have had more benefit from the sun in their normal growth, and the latter are further treated to the extent of the influence of the additional treatment by the ultra-violet rays. Thereby, all of the berries will be brought to the state of a common, uniform, and desired standard, the result being a correspondingly uniform taste or flavor throughout the entire batch or mixture.

Although it is impossible to state the exact chemical or other reaction or reformation that transpires throughout the batch, it has been proven by tests that by the treatment of the batch or mixed coffee berries of different qualities by the ultra-violet rays, an advantageous result is gained that has never previously been reached; namely, the elimination of objectionable excessive presence of chlorogenic acid. It is believed that it is the presence of chlorogenic acid in undue quantities, as an ingredient of coffee berries, that causes a coffee beverage to possess the rancid, green, or grassy taste. A certain proportion of this acid ingredient appears to exert no objectionable influence on the flavor or taste quality of the coffee, but its presence beyond a given amount impairs the beverage so far as its flavor or taste quality is concerned.

The ultra-violet ray treatment, as stated, of the entire batch or mixture substantially reduces this chlorogenic acid constituent and rids the final product free of the taste or flavor thereof. In that aspect, the practice of the improved method thereof lends itself to the attainment of the predetermined uniform nicety, or standard of taste or flavor quality of the product throughout; that is, irrespective of where any portion of the batch or mixture may be abstracted from the bulk or batch that has undergone the method of treatment of the instant invention.

In practicing said invention, the appropriate coffee berries emanating from the preferred plantations or sources selected, for instance as hereinabove outlined, are brought together in any desired proportions and intimately mixed, for example, utilizing the preferred coffee (as the Brazilian) as the base or greater proportion, and the others (as Colombian) in minor proportions, dependent upon the taste or flavor desired; these intimately mixed coffees thus affording the batch to be treated.

While preferably and ordinarily this mixture or batch will comprise the coffee berries for subjection to further treatment, it is appreciated that the additional treatment in other instances can be successfully pursued after grinding the mixture. Therefore, it will be understood that this pre-grinding modification of the preferred method of the invention embodying the treatment of the whole berry is within the scope of the invention.

The next step will be, preferably, a spreading out of the mixture or batch into a relatively thin layer formation, as distinguished from the greater depth or density of the bulk or initially mixed batch, and finally subjecting the spread-out coffee berries to the action of ultra-violet rays; in other words, irradiating the coffee throughout. The rays are applied to the coffee for a period preferably between four to six minutes, the present practice being for substantially a five-minute period, which is giving very satisfactory results. However, the range of periods of practical treatment is between a period of three and one-half minutes as a minimum and a period of six minutes as a useful maximum. In this connection a consideration to have in mind is that while the treatment may be carried on even beyond the six-minute period to as high as thirty minutes, and in fact therebeyond, tests have proved that no substantial effect is had on the mixture of berries when unduly prolonging the treatment. It appears that a treatment terminating at the end of a six-minute period has just about the same result on the berries as a treatment carried beyond such six-minute period.

The foregoing observation is relevant, because the demonstration of the fact that there is no changed condition in the berries from a prolonged treatment by the ultra-violet rays as compared to the effect on the berries at the end of a treatment for six minutes shows that the berries that have initially received the better benefit from the natural violet rays of the sun, together with the berries that have received less benefit in that regard, can, as a mixture, be additionally treated by subjection to said ultra-violet rays to bring all berries of the batch to a like or equivalent ultimate stage of treatment to obtain the predetermined standard without causing any deleterious or harmful effects on those berries that theretofore had the best opportunity for treatment by the natural rays of the sun.

A batch of the miscellaneous berries gathered from the different original sources, when irradiated according to the step of the method including the application of the ultra-violet rays to the mixture for the period stated—approximately six minutes—will reduce the chlorogenic acid content in the neighborhood of 30%; or, more specifically, in an instance where the product with no light treatment originally contained 9.7 chlorogenic acid, the same product when subjected to the light treatment for the six-minute period showed the chlorogenic acid to have been reduced to 6.4, a comparatively unobjectionable quantity so far as the taste quality of the coffee is concerned.

While it is contemplated that the preferable period of treatment of the mixture be a continuous one, that is, uninterruptedly for six minutes, it is noted that in a test such as just referred to, the mixture was subjected to repeated treatments by the ultra-violet rays for successive periods of two minutes each, aggregating a six-minute period. So, it must be further understood that in respect to periods of treatment, the invention embraces the ultra-violet ray irradiation, whether the application of the light be continuous or intermittent, so long as the total period of treatment is followed out.

After the desired treatment of the mixture or batch has been accomplished by the irradiation method stated, the irradiated coffee berries are ready for roasting and grinding and use in beverage form in the habitual manner.

While herein there is disclosed a practical and the preferred form or manner of practicing the method of the present invention, it will be clear that the invention is not to be restricted to specific details recited, save as the same may be included in the hereto appended claims.

I claim:

1. The method of treating a batch of coffee comprising a mixture of coffee berries of substantially different qualities to impart to the resultant product a substantially uniform taste characteristic throughout the batch, the same consisting in bringing together a lot of berries known to have been substantially exposed to the natural violet rays of the sun and other berries known not to have had similar exposure or for other reasons to be of relatively inferior quality, intimately mixing the two grades of berries, dispersing the mixture to present the same in relatively thin layer formation, and subjecting said layer to the influence of ultra-violet rays for a period of approximately 3½ to 6 minutes, thereby reducing any chlorogenic acid content to a negligible quantity and irradiating the entire batch to a substantial degree above said natural irradiation of the first-mentioned lot of berries, whereby the whole will have an equivalent treatment by violet rays and coffee abstracted anywhere from the batch will possess substantially identical taste.

2. The method of treating a batch of coffee comprising a mixture of coffee berries from various sources and possessing different qualities, to impart to the resultant product a substantially uniform taste characteristic throughout the batch, the same consisting in intermittently mixing the different lots of berries together and subjecting the same to the influence of ultra-violet rays for a period of approximately six minutes, to reduce any chlorogenic acid to a negligible quantity and irradiate the entire batch to a degree whereby the whole will have equivalent treatment by violet rays and coffee abstracted anywhere from the batch will possess substantially identical taste.

3. The method of treating a batch of coffee comprised of a mixture of coffee berries from different sources, to impart to the resultant product a substantially uniform taste or flavor characteristic throughout the entire batch, the same consisting in bringing together several lots of berries, intermittently mixing the berries from the various lots, and subjecting the intermixture to the influence of ultra-violet rays for approximately five minutes to additionally irradiate the berries that have received substantial treatment by the natural rays of the sun and to treat the relatively less cured berries to a point equal to said additional treatment of said first-mentioned berries, whereby the whole intermixture will ultimately have had equivalent irradiation and coffee abstracted anywhere from the batch will possess substantially identical taste.

4. The method of treating a batch of coffee made up of miscellaneous lots of coffee berries some of which have been subjected to relatively substantial influence of the natural violet rays of the sun and others of which have been grown under relatively less favorable conditions or have become deteriorated, whereby there is imparted thereto a rancid or green taste, the same consisting in intermixing the berries of said various qualities and subjecting the entire mixture to the influence of ultra-violet rays for a period sufficiently long to cure all of the berries throughout the whole batch for a period of 3½–5 minutes.

GWYNNE EVANS.